US009147364B2

(12) United States Patent
Wu et al.

(10) Patent No.: US 9,147,364 B2
(45) Date of Patent: Sep. 29, 2015

(54) ELECTROPHORETIC DISPLAY CAPABLE OF REDUCING PASSIVE MATRIX COUPLING EFFECT

(71) Applicant: SiPix Technology, Inc., Taoyuan (TW)

(72) Inventors: Yan-Liang Wu, Kaohsiung (TW); Chi-Mao Hung, Hsinchu (TW); Wei-Min Sun, Taipei (TW); Pei-Lin Tien, Taichung (TW); Chih-Yuan Hsu, Taipei (TW); Hsiao-Lung Cheng, Taoyuan County (TW)

(73) Assignee: SiPix Technology, Inc., Kueishan, Taoyuan (TW)

( * ) Notice: Subject to any disclaimer, the term of this patent is extended or adjusted under 35 U.S.C. 154(b) by 0 days.

(21) Appl. No.: 14/155,329

(22) Filed: Jan. 14, 2014

(65) Prior Publication Data

US 2014/0232628 A1 Aug. 21, 2014

(30) Foreign Application Priority Data

Feb. 20, 2013 (TW) ............................ 102105913 A

(51) Int. Cl.
*G09G 3/34* (2006.01)
*G02F 1/167* (2006.01)

(52) U.S. Cl.
CPC .............. *G09G 3/3446* (2013.01); *G02F 1/167* (2013.01); *G09G 3/344* (2013.01); *G09G 2300/06* (2013.01); *G09G 2320/0209* (2013.01)

(58) Field of Classification Search
CPC ................. G02F 1/167; G09G 3/3446; G09G 2320/0209; G09G 2300/06; G09G 3/344
USPC .......................................................... 345/107
See application file for complete search history.

(56) References Cited

U.S. PATENT DOCUMENTS 6,909,415 B2 6/2005 Kumagawa
2011/0285610 A1* 11/2011 Yan et al. ........................ 345/55
2012/0099180 A1 4/2012 Chiu

FOREIGN PATENT DOCUMENTS

TW 526363 4/2003
TW 201217877 A1 5/2012

* cited by examiner

*Primary Examiner* — Charles V Hicks
(74) *Attorney, Agent, or Firm* — Winston Hsu; Scott Margo

(57) ABSTRACT

An electrophoretic display capable of reducing passive matrix coupling effect includes an electrophoretic panel, a coupling capacitor group, a plurality of first scan lines, and a plurality of second scan lines. The electrophoretic panel includes a plurality of pixels. The coupling capacitor group includes a plurality of coupling capacitors. Each pixel of the plurality of pixels is coupled to a storage capacitor and corresponds to a coupling capacitor, the storage capacitor is coupled to a first scan line and a second scan line, the coupling capacitor is coupled to another first scan line and the second scan line, and the coupling capacitor is not coupled to any pixel.

7 Claims, 10 Drawing Sheets

ELECTROPHORETIC DISPLAY CAPABLE OF REDUCING PASSIVE MATRIX COUPLING EFFECT

BACKGROUND OF THE INVENTION

1. Field of the Invention

The present invention relates to an electrophoretic display, and particularly to an electrophoretic display that can utilize a coupling capacitor group to reduce passive matrix coupling effect.

2. Description of the Prior Art

Please refer to FIG. 1 and FIG. 2. FIG. 1 is a diagram illustrating a pixel P1 of a passive matrix panel 100 being driven according to the prior art, and FIG. 2 is a diagram illustrating an equivalent circuit of storage capacitors CP2-CP9 corresponding to pixels P2-P9 adjacent to the pixel P1 when the pixel P1 is driven, where the pixel P1 is coupled to a first scan line 102 and a second scan line 104. As shown in FIG. 1, when the pixel P1 is driven, the first scan line 102 is applied to a first driving voltage (e.g. 15V), the second scan line 104 is applied to a second driving voltage (e.g. 0V), and other first scan lines and other second scan lines of the passive matrix panel 100 are floating, where the first scan line 102 coupled to the pixel P1 is located on a first axis direction of the passive matrix panel 100, the second scan line 104 coupled to the pixel P1 is located on a second axis direction of the passive matrix panel 100, and the first axis direction is perpendicular to the second axis direction. Therefore, the pixel P1 can display a first color according to a voltage drop (15V−0V) between the first driving voltage and the second driving voltage stored in a storage capacitor CP1 corresponding to the pixel P1, and each pixel of other pixels of the passive matrix panel 100 can display a previously displayed color.

As shown in FIG. 2, when the first driving voltage is applied to the first scan line 102, other pixels of the passive matrix panel 100 are not turned off, so the first driving voltage for driving the pixel P1 can be coupled to storage capacitors (e.g. the storage capacitor CP4 corresponding to the pixel P4 and the storage capacitor CP7 corresponding to the pixel P7) corresponding to pixels coupled to the first scan line 102, resulting in each pixel of the pixels coupled to the first scan line 102 (e.g. the pixel P4 and the pixel P7) display a color (e.g. a black color, a white color, or neither a black color nor a white color) unwanted by a user. Therefore, the prior art is not a good driving method for the passive matrix panel 100.

SUMMARY OF THE INVENTION

An embodiment provides an electrophoretic display capable of reducing passive matrix coupling effect. The electrophoretic display includes an electrophoretic panel, a coupling capacitor group, a plurality of first scan lines, and a plurality of second scan lines. The electrophoretic panel includes a plurality of pixels, and has a first axis direction. The coupling capacitor group is installed on the first axis direction, where the coupling capacitor group includes a plurality of coupling capacitors. The plurality of first scan lines is installed on the first axis direction. The plurality of second scan lines is installed on a second axis direction of the electrophoretic panel, where the first axis direction is perpendicular to the second axis direction. Each pixel of the plurality of pixels is coupled to a storage capacitor and corresponds to a coupling capacitor, the storage capacitor is coupled to a first scan line of the plurality of first scan lines and a second scan line of the plurality of second scan lines, the coupling capacitor is coupled to another first scan line and the second scan line, and the coupling capacitor is not coupled to any pixel.

Another embodiment provides an electrophoretic display capable of reducing passive matrix coupling effect. The electrophoretic display includes an electrophoretic panel, a coupling capacitor group, a plurality of first scan lines, and a plurality of second scan lines. The electrophoretic panel includes a plurality of pixels, and has a first axis direction. The coupling capacitor group is installed on the first axis direction, where the coupling capacitor group includes a plurality of coupling capacitors. The plurality of first scan lines is installed on the first axis direction. The plurality of second scan lines is installed on a second axis direction of the electrophoretic panel, where the first axis direction is perpendicular to the second axis direction. Each pixel of the plurality of pixels is coupled to a storage capacitor and corresponds to a coupling capacitor of the plurality of coupling capacitors, the storage capacitor is coupled to a first scan line of the plurality of first scan lines and a second scan line of the plurality of second scan lines, the coupling capacitor is composed of a parallel storage capacitor group of the plurality of pixels, and the parallel storage capacitor group is located at a non-active region of the electrophoretic panel.

The present invention provides an electrophoretic display capable of reducing passive matrix coupling effect. The electrophoretic display utilizes a plurality of coupling capacitors of a coupling capacitor group to reduce coupling voltages coupled to a plurality of pixels corresponding to a pixel when the pixel is driven according to a driving voltage. Thus, compared to the prior art, the present invention can ensure that each pixel of the electrophoretic panel displays a color wanted by a user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
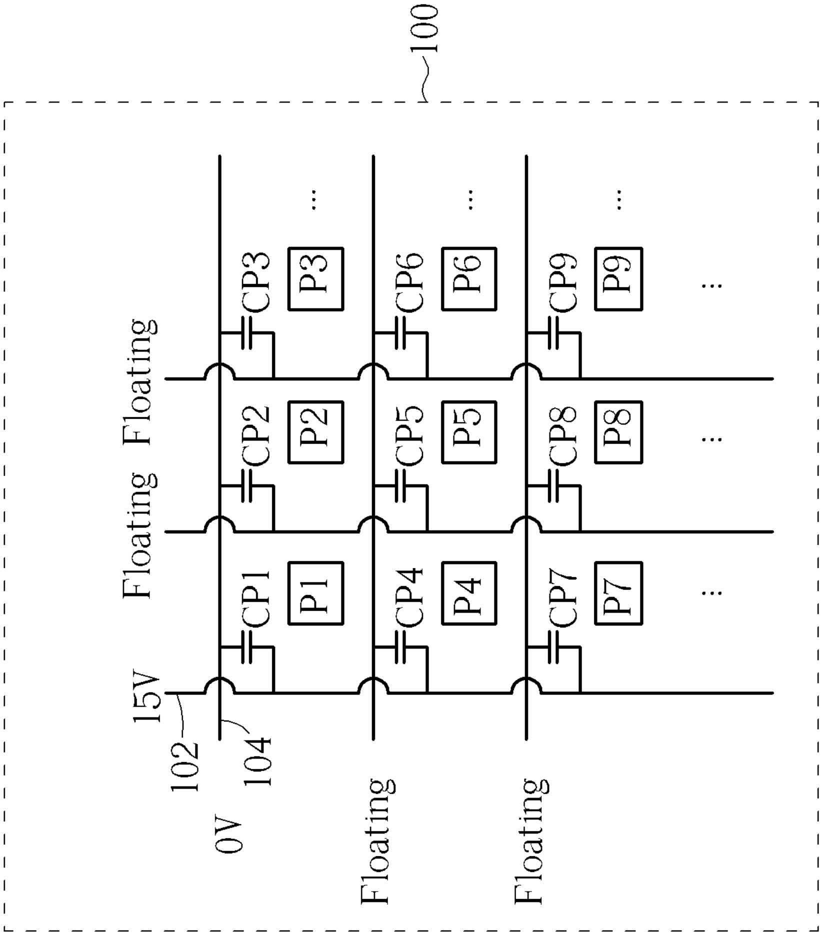
FIG. 1 PRIOR ART
FIG. 1 is a diagram illustrating a pixel of a passive matrix panel being driven according to the prior art.
Figure 2:
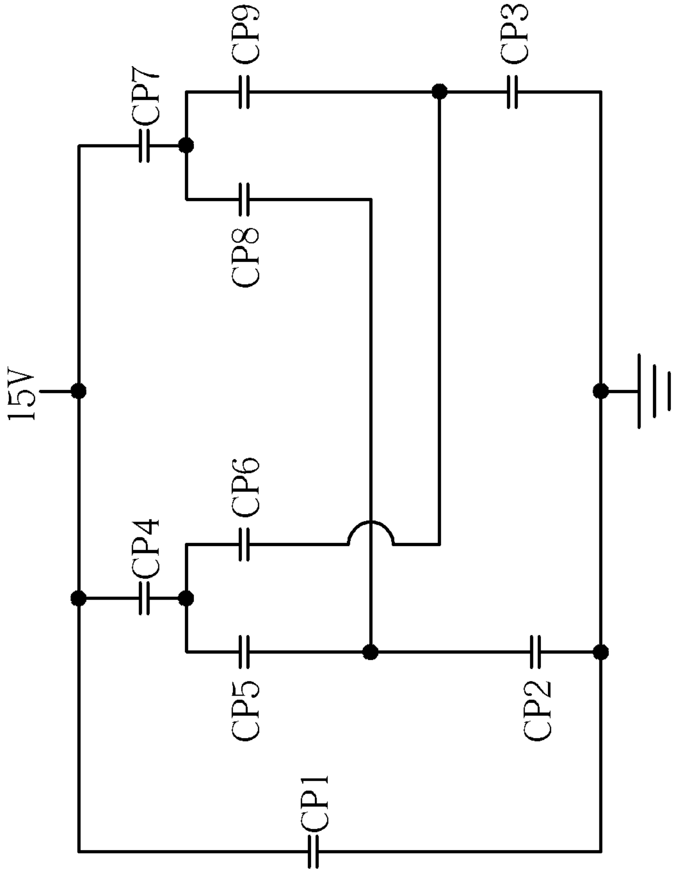
FIG. 2 PRIOR ART
FIG. 2 is a diagram illustrating an equivalent circuit of storage capacitors corresponding to pixels adjacent to the pixel when the pixel is driven.
Figure 3:
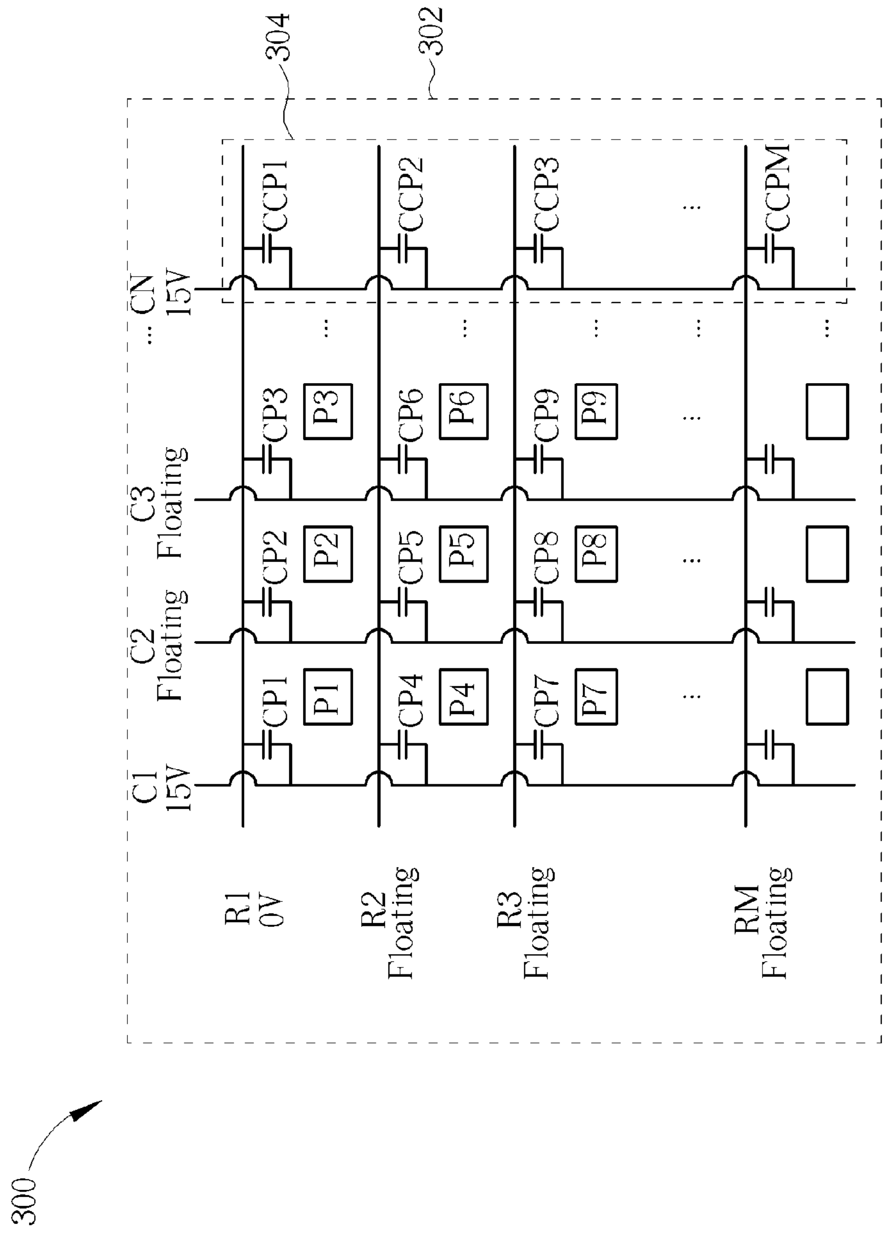
FIG. 3 is a diagram illustrating an electrophoretic display capable of reducing passive matrix coupling effect according to an embodiment.

Please refer to FIG. 3. FIG. 3 is a diagram illustrating an electrophoretic display 300 capable of reducing passive matrix coupling effect according to an embodiment. The electrophoretic display 300 includes an electrophoretic panel (passive matrix panel) 302, a coupling capacitor group 304, a plurality of first scan lines C1-CN, and a plurality of second scan lines R1-RM, where the plurality of first scan lines C1-CN are installed on a vertical axis direction of the electrophoretic panel 302, the plurality of second scan lines R1-RM are installed on a horizontal axis direction of the electrophoretic panel 302, and N, M are positive integers. The electrophoretic panel 302 includes a plurality of pixels. The coupling capacitor group 304 is installed on the vertical axis direction, where the coupling capacitor group 304 includes a plurality of coupling capacitors CCP1-CCPM, where capacitances of the plurality of coupling capacitors CCP1-CCPM are the same or different. In addition, each pixel of the plurality of pixels included in the electrophoretic panel 302 is coupled to a storage capacitor and corresponds to a coupling capacitor, where the storage capacitor is used for storing a driving voltage (e.g. 15V) driven each pixel, the coupling capacitor is used for reducing a coupling voltage coupled to the pixel. For example, a pixel P1 included in the electrophoretic panel 302 is coupled to a storage capacitor CP1 and corresponds to the coupling capacitor CCP1, and a ratio of a capacitance of the coupling capacitor CCP1 to a capacitance of the storage capacitor CP1 is between 0.2 and 2, where the storage capacitor CP1 is coupled to the first scan line C1 and the second scan line R1, and the coupling capacitor CCP1 is coupled to the first scan line CN and the second scan line R1. But, the present invention is not limited to the ratio of the capacitance of the coupling capacitor CCP1 to the capacitance of the storage capacitor CP1 being between 0.2 and 2. That is to say, any configuration in which utilizing a coupling capacitor to reduce a coupling voltage coupled to a corresponding pixel falls within the scope of the present invention.

Figure 4:
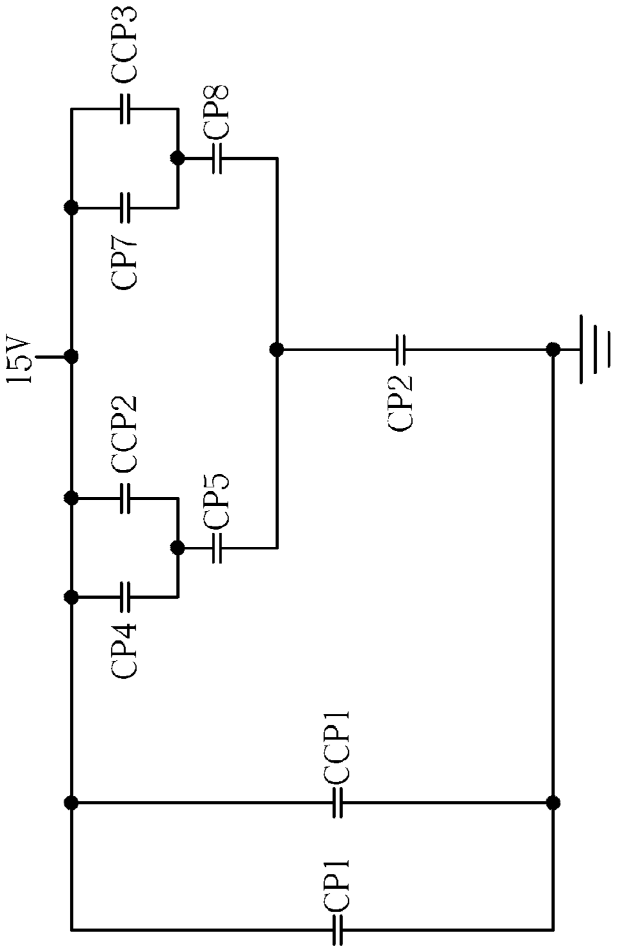
FIG. 4 is a diagram illustrating an equivalent circuit of storage capacitors corresponding to pixels adjacent to the pixel when the pixel is driven.

As shown in FIG. 3, when the pixel P1 is driven according to a driving voltage (e.g. 15V), the first scan line C1 and the first scan line CN receive the driving voltage (e.g. 15V), the second scan line R1 is coupled to ground (e.g. 0V), and other first scan lines of the plurality of first scan lines C1-CN and other second scan lines of the plurality of second scan lines R1-RM are floating. Therefore, please refer to FIG. 4. FIG. 4 is a diagram illustrating an equivalent circuit of storage capacitors CP2-CP9 corresponding to pixels P2-P9 adjacent to the pixel P1 when the pixel P1 is driven. But, FIG. 4 is only used for describing the present invention, that is, the present invention is not limited to pixels adjacent to the pixel P1 are only the pixels P2-P9. As shown in FIG. 3 and FIG. 4, when the pixel P1 is driven according to the driving voltage (e.g. 15V), because the coupling capacitor CCP2 is parallel to the pixel P4 and the coupling capacitor CCP3 is parallel to the pixel P7, the coupling capacitor CCP2 can reduce a coupling voltage coupled to the pixel P4 and the coupling capacitor CCP3 can reduce a coupling voltage coupled to the pixel P7.

Figure 5:
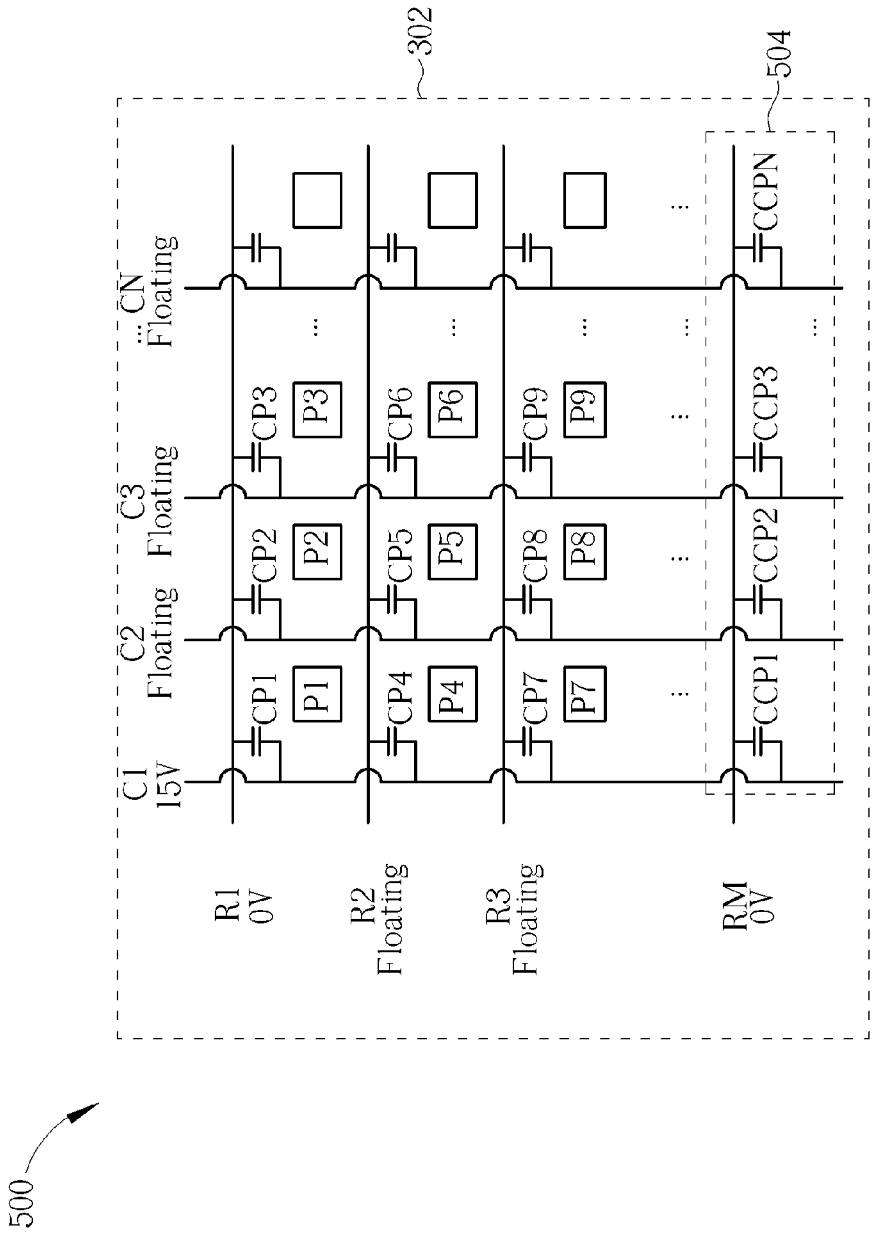
FIG. 5 is a diagram illustrating an electrophoretic display capable of reducing passive matrix coupling effect according to another embodiment.

Please refer to FIG. 5. FIG. 5 is a diagram illustrating an electrophoretic display 500 capable of reducing passive matrix coupling effect according to another embodiment. The electrophoretic display 500 includes an electrophoretic panel 302, a coupling capacitor group 504, a plurality of first scan lines C1-CN, and a plurality of second scan lines R1-RM. A difference between the electrophoretic display 500 and the electrophoretic display 300 is that the coupling capacitor group 504 is installed on the horizontal axis direction of the electrophoretic panel 302, and the coupling capacitor group 504 includes a plurality of coupling capacitors CCP1-CCPN.

Figure 6:
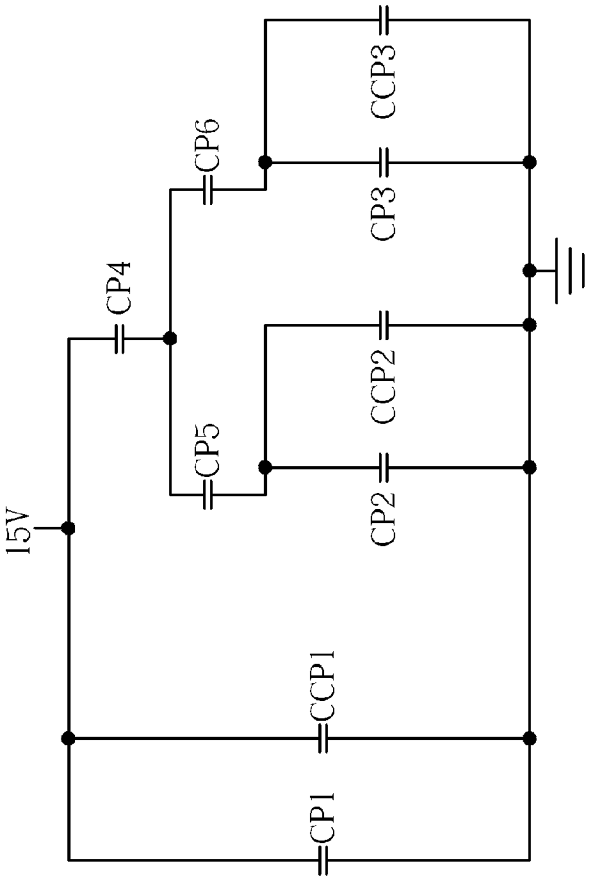
FIG. 6 is a diagram illustrating an equivalent circuit of storage capacitors corresponding to pixels adjacent to the pixel when the pixel is driven.

As shown in FIG. 5, when the pixel P1 is driven according to a driving voltage (e.g. 15V), the first scan line C1 receives the driving voltage (e.g. 15V), the second scan line R1 and the second scan line RM are coupled to the ground (e.g. 0V), and other first scan lines of the plurality of first scan lines C1-CN and other second scan lines of the plurality of second scan lines R1-RM are floating. Therefore, please refer to FIG. 6. FIG. 6 is a diagram illustrating an equivalent circuit of the storage capacitors CP2-CP9 corresponding to the pixels P2-P9 adjacent to the pixel P1 when the pixel P1 is driven. But, FIG. 6 is only used for describing the present invention, that is, the present invention is not limited to pixels adjacent to the pixel P1 are only the pixels P2-P9. As shown in FIG. 5 and FIG. 6, when the pixel P1 is driven according to the driving voltage (e.g. 15V), because the coupling capacitor CCP2 is parallel to the pixel P2 and the coupling capacitor CCP3 is parallel to the pixel P3, the coupling capacitor CCP2 can reduce a coupling voltage coupled to the pixel P2 and the coupling capacitor CCP3 can reduce a coupling voltage coupled to the pixel P3. In addition, subsequent operational principles of the electrophoretic display 500 are the same as those of the electrophoretic display 300, so further description thereof is omitted for simplicity.

Figure 7:
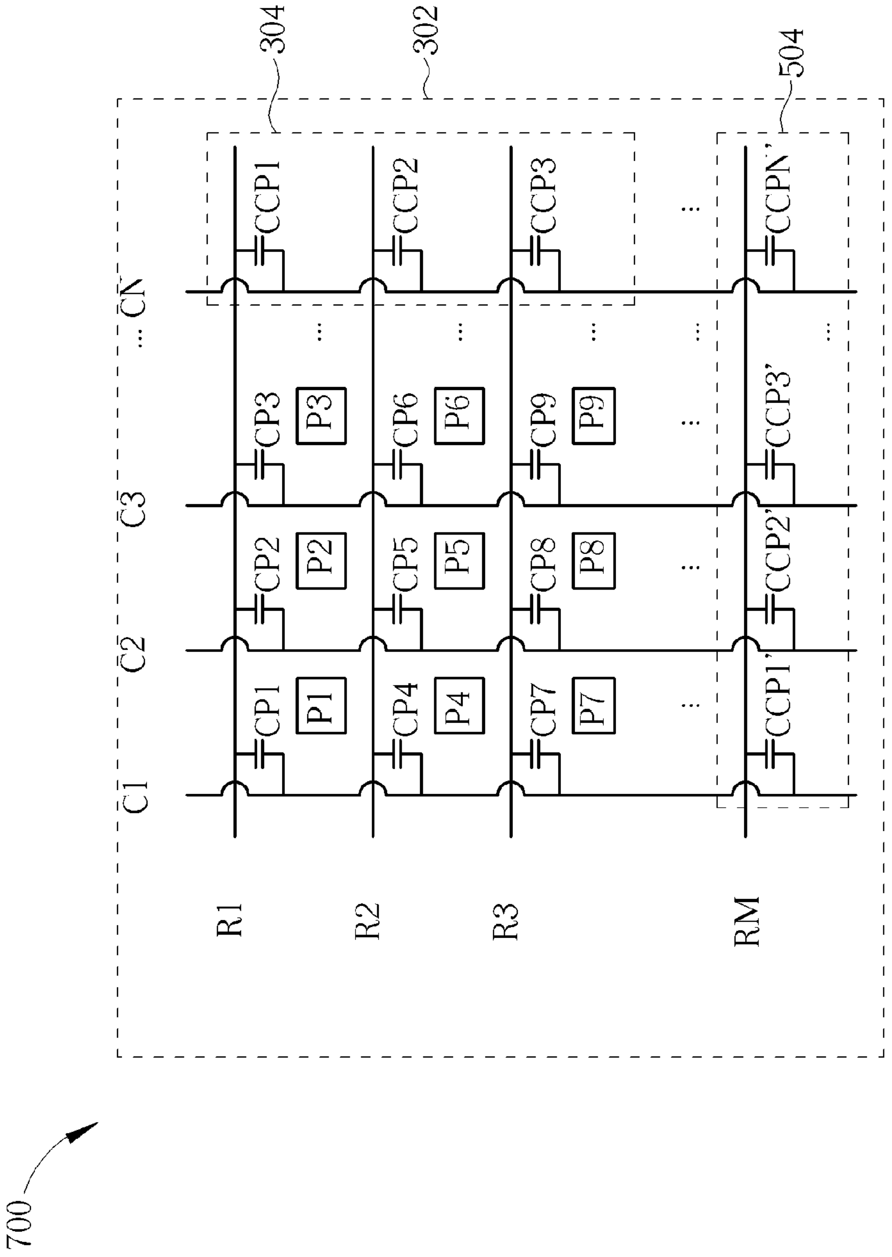
FIG. 7 is a diagram illustrating an electrophoretic display capable of reducing passive matrix coupling effect according to another embodiment.

Please refer to FIG. 7. FIG. 7 is a diagram illustrating an electrophoretic display 700 capable of reducing passive matrix coupling effect according to another embodiment. As shown in FIG. 7, a difference between the electrophoretic display 700 and the electrophoretic display 300 is that the electrophoretic display 700 includes coupling capacitor groups 304, 504, where the coupling capacitor group 304 is installed on the vertical axis direction of the electrophoretic panel 302 and includes coupling capacitors CCP1-CCPM, and the coupling capacitor group 504 is installed on the horizontal axis direction of the electrophoretic panel 302 and includes coupling capacitors CCP1'-CCPN'. In addition, subsequent operational principles of the electrophoretic display 700 are the same as those of the electrophoretic display 300, so further description thereof is omitted for simplicity.

Figure 8:
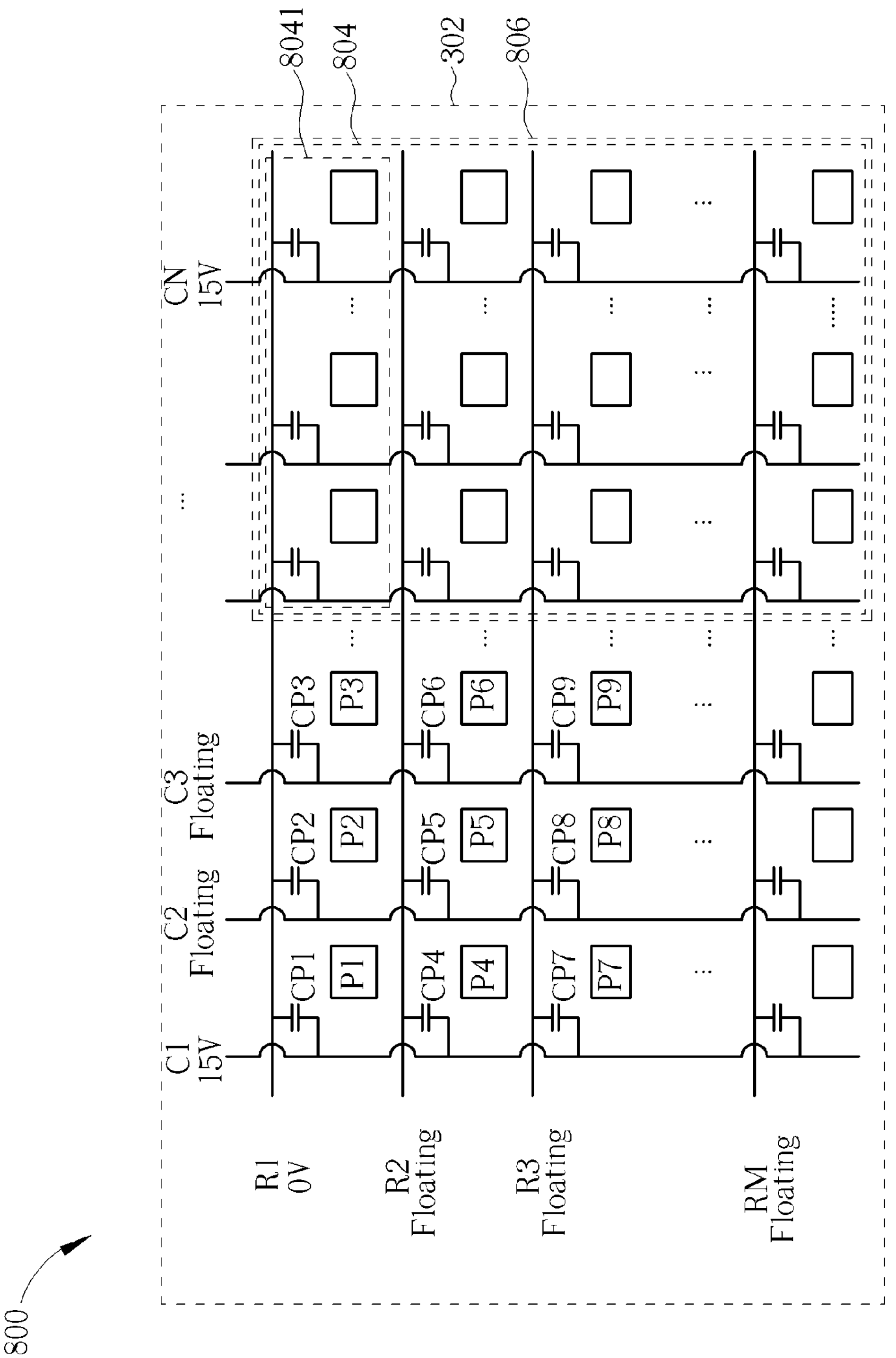
FIG. 8 is a diagram illustrating an electrophoretic display capable of reducing passive matrix coupling effect according to another embodiment.

Please refer to FIG. 8. FIG. 8 is a diagram illustrating an electrophoretic display 800 capable of reducing passive matrix coupling effect according to another embodiment. As shown in FIG. 8, a difference between the electrophoretic display 800 and the electrophoretic display 300 is that each coupling capacitor of a coupling capacitor group 804 is composed of a parallel storage capacitor group of the plurality of pixels included in the electrophoretic panel 302, where the coupling capacitor group 804 is located at a non-active region 806 of the electrophoretic panel 302. For example, a coupling capacitor CCP1 is composed of a parallel storage capacitor group 8041. In addition, subsequent operational principles of the electrophoretic display 800 are the same as those of the electrophoretic display 300, so further description thereof is omitted for simplicity.

Figure 9:
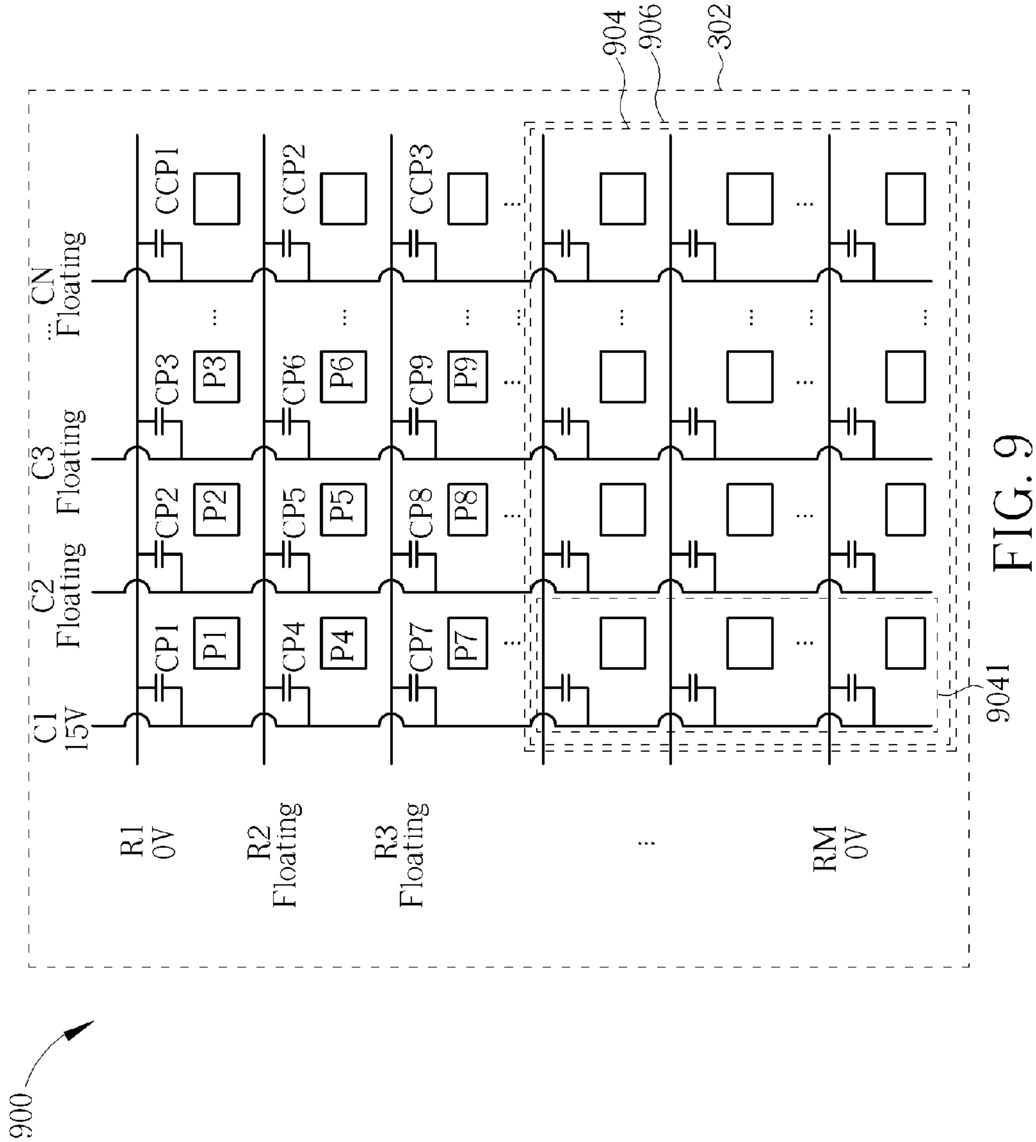
FIG. 9 is a diagram illustrating an electrophoretic display capable of reducing passive matrix coupling effect according to another embodiment.

Please refer to FIG. 9. FIG. 9 is a diagram illustrating an electrophoretic display 900 capable of reducing passive matrix coupling effect according to another embodiment. As shown in FIG. 9, a difference between the electrophoretic display 900 and the electrophoretic display 500 is that each coupling capacitor of a coupling capacitor group 904 is composed of a parallel storage capacitor group of the plurality of pixels included in the electrophoretic panel 302, where the coupling capacitor group 904 is located at a non-active region

906 of the electrophoretic panel 302. For example, a coupling capacitor CCP1 is composed of a parallel storage capacitor group parallel storage capacitor group 9041. In addition, subsequent operational principles of the electrophoretic display 900 are the same as those of the electrophoretic display 500, so further description thereof is omitted for simplicity.

Figure 10:
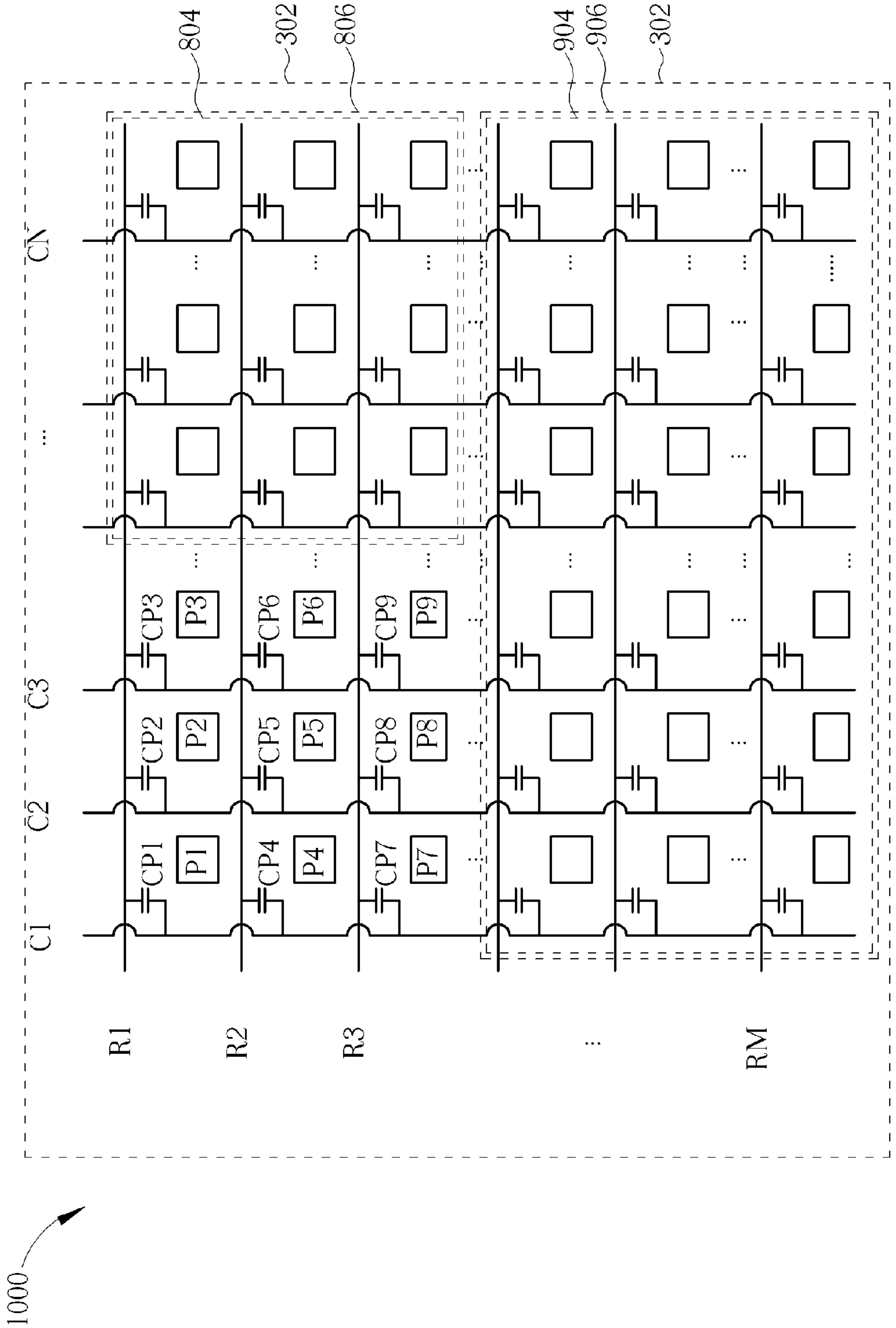
FIG. 10 is a diagram illustrating an electrophoretic display capable of reducing passive matrix coupling effect according to another embodiment.

Please refer to FIG. 10. FIG. 10 is a diagram illustrating an electrophoretic display 1000 capable of reducing passive matrix coupling effect according to another embodiment. As shown in FIG. 10, a difference between the electrophoretic display 1000 and the electrophoretic display 900 is that the electrophoretic display 1000 further includes a coupling capacitor group 804, where the coupling capacitor group 804 is located at the non-active region 806 of the electrophoretic panel 302. In addition, subsequent operational principles of the electrophoretic display 1000 are the same as those of the electrophoretic display 900, so further description thereof is omitted for simplicity.

To sum up, the electrophoretic display capable of reducing passive matrix coupling effect utilizes a plurality of coupling capacitors of a coupling capacitor group to reduce coupling voltages coupled to a plurality of pixels corresponding to a pixel when the pixel is driven according to a driving voltage. Thus, compared to the prior art, the present invention can ensure that each pixel of the electrophoretic panel displays a color wanted by a user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electrophoretic display capable of reducing passive matrix coupling effect, the electrophoretic display comprising:

an electrophoretic panel comprising a plurality of pixels, wherein the electrophoretic panel has a first axis direction;

a coupling capacitor group installed on the first axis direction, wherein the coupling capacitor group comprises a plurality of coupling capacitors;

a plurality of first scan lines installed on the first axis direction; and a plurality of second scan lines installed on a second axis direction of the electrophoretic panel, wherein the first axis direction is perpendicular to the second axis direction;

wherein each pixel of the plurality of pixels is coupled to a storage capacitor and corresponds to a coupling capacitor of the plurality of coupling capacitors, the storage capacitor is coupled to a first scan line of the plurality of first scan lines and a second scan line of the plurality of second scan lines, the coupling capacitor is coupled to another first scan line and the second scan line, and the coupling capacitor is not directly connected to any pixel.

2. The electrophoretic display of claim 1, wherein when the pixel is driven according to a driving voltage, the first scan line and the another first scan line receives the driving voltage, the second scan line is coupled to ground, and other first scan lines of the plurality of first scan lines and other second scan lines of the plurality of second scan lines are floating.

3. The electrophoretic display of claim 1, wherein capacitances of the plurality of coupling capacitors are the same.

4. The electrophoretic display of claim 1, wherein capacitances of the plurality of coupling capacitors are different.

5. An electrophoretic display capable of reducing passive matrix coupling effect, the electrophoretic display comprising:

an electrophoretic panel comprising a plurality of pixels, wherein the electrophoretic panel has a first axis direction;

a coupling capacitor group installed on the first axis direction, wherein the coupling capacitor group comprises a plurality of coupling capacitors;

a plurality of first scan lines installed on the first axis direction; and a plurality of second scan lines installed on a second axis direction of the electrophoretic panel, wherein the first axis direction is perpendicular to the second axis direction;

wherein each pixel of the plurality of pixels is coupled to a storage capacitor and corresponds to a coupling capacitor of the plurality of coupling capacitors, the storage capacitor is coupled to a first scan line of the plurality of first scan lines and a second scan line of the plurality of second scan lines, the coupling capacitor is composed of a parallel storage capacitor group of the plurality of pixels, and the parallel storage capacitor group is located at a non-active region of the electrophoretic panel.

6. The electrophoretic display of claim 5, wherein capacitances of the plurality of coupling capacitors are the same.

7. The electrophoretic display of claim 5, wherein capacitances of the plurality of coupling capacitors are different.

* * * * *